(12) United States Patent
Yang et al.

(10) Patent No.: US 10,620,585 B2
(45) Date of Patent: Apr. 14, 2020

(54) METHOD, DEVICE, SYSTEM AND STORAGE MEDIUM FOR DISPLAYING A HOLOGRAPHIC PORTRAIT IN REAL TIME

(71) Applicant: Shenzhen Starfield Information Technologies Co., Ltd., Shenzhen, Guangdong Province (CN)

(72) Inventors: Yantao Yang, Shenzhen (CN); Ting Zhang, Shenzhen (CN); Junqing Fang, Shenzhen (CN); Ting Cao, Shenzhen (CN)

(73) Assignee: SHENZHEN STARFIELD INFORMATION TECHNOLOGIES CO., Ltd., Shenzhen (CN)

( * ) Notice: Subject to any disclaimer, the term of this patent is extended or adjusted under 35 U.S.C. 154(b) by 217 days.

(21) Appl. No.: 15/956,705

(22) Filed: Apr. 18, 2018

(65) Prior Publication Data
US 2019/0155215 A1  May 23, 2019

(30) Foreign Application Priority Data
Nov. 18, 2017 (CN) .......................... 2017 1 1153916

(51) Int. Cl.
| | |
|---|---|
| G06K 9/00 | (2006.01) |
| G03H 1/00 | (2006.01) |
| G03H 1/26 | (2006.01) |
| G03H 1/22 | (2006.01) |
| G02B 27/01 | (2006.01) |

(52) U.S. Cl.
CPC ......... *G03H 1/0005* (2013.01); *G02B 27/017* (2013.01); *G03H 1/2249* (2013.01); *G03H 1/268* (2013.01); *G03H 2001/0088* (2013.01); *G03H 2210/42* (2013.01)

(58) Field of Classification Search
None
See application file for complete search history.

(56) References Cited

U.S. PATENT DOCUMENTS

| | | | | |
|---|---|---|---|---|
| 8,446,654 B2* | 5/2013 | Buschbeck | ......... | G03H 1/2205 359/9 |
| 2003/0210461 A1* | 11/2003 | Ashizaki | ............... | G03H 1/268 359/443 |
| 2014/0267598 A1* | 9/2014 | Drouin | ................. | G03H 1/0005 348/40 |
| 2015/0009391 A1* | 1/2015 | Kim | ................... | H04N 5/23216 348/333.05 |

(Continued)

*Primary Examiner* — Hadi Akhavannik
(74) *Attorney, Agent, or Firm* — ABC Patent Service, LLC; Frank Gao, Esq.

(57) ABSTRACT

The embodiment of the present application discloses a method, device, system and storage medium for displaying a holographic portrait in real time, applicable to reducing latency and achieving real-time display. A method in the application embodiment comprises: acquiring portrait data of a figure through somatosensory equipment; acquiring portrait data within a preset range as effective portrait data; blurring and storing the effective portrait data; sending the blurred effective portrait data to holographic display equipment frame by frame based on a first-in first-out principle, so as to display the effective portrait data of the figure on holographic projection of the holographic display equipment in real time, achieve real-time display of the holographic portrait, have a lower latency and improve user experience.

20 Claims, 2 Drawing Sheets

(56) References Cited

U.S. PATENT DOCUMENTS

| | | | |
|---|---|---|---|
| 2015/0070467 A1* | 3/2015 | Crowder | H04N 13/271 348/46 |
| 2015/0277378 A1* | 10/2015 | Smithwick | G03H 1/0808 359/9 |
| 2017/0168581 A1* | 6/2017 | Xu | G06F 3/011 |
| 2019/0068973 A1* | 2/2019 | Hamilton | H04L 65/607 |
| 2019/0271943 A1* | 9/2019 | Bezirganyan | H04N 9/3179 |

\* cited by examiner

METHOD, DEVICE, SYSTEM AND STORAGE MEDIUM FOR DISPLAYING A HOLOGRAPHIC PORTRAIT IN REAL TIME

CROSS REFERENCE TO RELATED APPLICATIONS

This application claims priority to Chinese patent Application No. 201711153916.0 filed with the Chinese Patent Office on Nov. 18, 2017, entitled "Method, Device, System and Storage Medium for Displaying A Holographic Portrait in Real Time", which is incorporated herein by reference in their entirety.

TECHNICAL FIELD

The present application relates to the technical field of three-dimensional somatosensory, particularly to a method, device, system and storage medium for displaying a holographic portrait in real time.

BACKGROUND

With continuous development of the society and economy, there are more and more electronic equipment, such as holographic display equipment and somatosensory equipment. Microsoft HoloLens is the first holographic computer equipment not restricted by cables, enabling a user to interact with a digital content and a holographic portrait in a real environment around. Hololens is an MR (mixed reality) product launched by Microsoft, i.e. containing VR (virtual reality) technique and AR (augmented reality) technique, and a wearer can watch a holographic virtual image in the reality with Hololens.

However, the present holographic display method has high latency and cannot achieve real-time holographic display, so it may result in an action of a figure and holographic projection getting out of synchronization, and greatly reduce user experience.

SUMMARY

The embodiment of present application provides a method, device, system and storage medium for displaying a holographic portrait in real time, applicable to reducing latency and achieving real-time display.

A method provided by the embodiment of present application for displaying a holographic portrait in real time comprises:

Acquiring portrait data of a figure through somatosensory equipment

Acquiring portrait data within a preset range as effective portrait data

Blurring and storing the effective portrait data sending the blurred effective portrait data to holographic display equipment frame by frame based on a first-in first-out principle, so as to display the effective portrait data of the figure on holographic projection of the holographic display equipment in real time.

Optionally, the step of acquiring portrait data within a preset range as effective portrait data comprises:

acquiring portrait data of a figure through a color camera sensor and a depth sensor of somatosensory equipment, each pixel point in the portrait data having corresponding coordinates;

taking the portrait data of the coordinates within a coordinate interval as effective portrait data according to the coordinate interval corresponding to the preset range.

Optionally, the step of blurring and storing the effective portrait data comprises:

blurring the effective portrait data by mean filter technology;

storing the blurred effective portrait data frame by frame.

Optionally, the portrait data comprises depth information and color information;

the step of storing the effective portrait data comprises:

saving depth information and color information corresponding to the effective portrait data in a preset depth information vector list and color information vector list frame by frame through inserting a function of a corresponding parameter in a data cube.

Optionally, the depth information vector list and color information vector list only save depth information and color information corresponding to one-frame effective portrait data respectively.

Optionally, the step of sending the blurred effective portrait data to holographic display equipment frame by frame based on a first-in first-out principle, so as to display the effective portrait data of the figure on holographic projection of the holographic display equipment in real time comprises:

sending the blurred effective portrait data to computer equipment connected with somatosensory equipment data frame by frame based on a first-in first-out principle;

sending the blurred effective portrait data to holographic display equipment connected with computer equipment data and provided on the head of the figure frame by frame through the computer equipment;

displaying the blurred effective portrait data on holographic projection of the holographic display equipment in real time frame by frame through the holographic display equipment, so as to synchronize an action of a figure in holographic display equipment in real time.

Optionally, the somatosensory equipment is Kinect somatosensory peripheral; the holographic display equipment is Hololens holographic computer equipment.

A device provided by the embodiment of present application for displaying a holographic portrait in real time comprises:

an acquisition module, used for acquiring portrait data of a figure through somatosensory equipment;

an effective acquisition module, used for acquiring portrait data within a preset range as effective portrait data;

an image processing module, used for blurring and storing the effective portrait data;

a sending display module, used for sending the blurred effective portrait data to holographic display equipment frame by frame based on a first-in first-out principle, so as to display the effective portrait data of the figure on holographic projection of the holographic display equipment in real time.

A system provided by the embodiment of present application for displaying a holographic portrait in real time comprises somatosensory equipment, computer equipment and holographic display equipment, wherein the somatosensory equipment is connected with computer equipment in a wired or wireless manner; the computer equipment is connected with the holographic display equipment in a wired or wireless manner;

the somatosensory equipment acquires portrait data of a figure and sends to computer equipment;

the computer equipment acquires portrait data within a preset range as effective portrait data;

the computer equipment blurs and stores the effective portrait data;

the computer equipment sends the blurred effective portrait data to holographic display equipment frame by frame based on a first-in first-out principle;

the holographic display equipment displays the effective portrait data of the figure on holographic projection of the holographic display equipment in real time.

A computer-readable storage medium provided by the embodiment of present application, with a computer program stored thereon, wherein the computer program is executed to achieve the method for displaying a holographic portrait in real time.

As can be seen from the above technical solution, the embodiment of the present application has the following advantages:

in this embodiment, acquiring portrait data of a figure through somatosensory equipment; acquiring portrait data within a preset range as effective portrait data; blurring and storing the effective portrait data; sending the blurred effective portrait data to holographic display equipment frame by frame based on a first-in first-out principle, so as to display the effective portrait data of the figure on holographic projection of the holographic display equipment in real time, achieve real-time display of the holographic portrait, have a lower latency and improve user experience.

DETAILED DESCRIPTION

The embodiment of present application provides a method, device, system and storage medium for displaying a holographic portrait in real time, applicable to reducing latency and achieving real-time display. To enable the purposes, features and advantages of the present invention to be more obvious and easier to understand, the following paragraphs will illustrate the specific implementations of the present invention with the appended drawings in details. Many specific details will be depicted below to facilitate the full understanding of the present invention. Nevertheless, the present application can be implemented by many other different means described herein. A person skilled in the art can do similar improvements without prejudice to the meanings hereof. Thus, the present application is not limited by the specific implementations disclosed below. Unless otherwise defined, all technical and scientific terms used herein have the same meaning as those generally understood by a person skilled in the art belonging to the technical field of the present invention. All terms used in the Description of the present invention only aim to describe the specific embodiments, rather than limiting the present invention. All technical features of the above embodiments can be combined arbitrarily. In an attempt to make the description concise, all possible combinations of all technical features in the above embodiments are not depicted. However, combinations of these technical features without contradiction should be regarded as scopes recorded in the Description.

Figure 1:
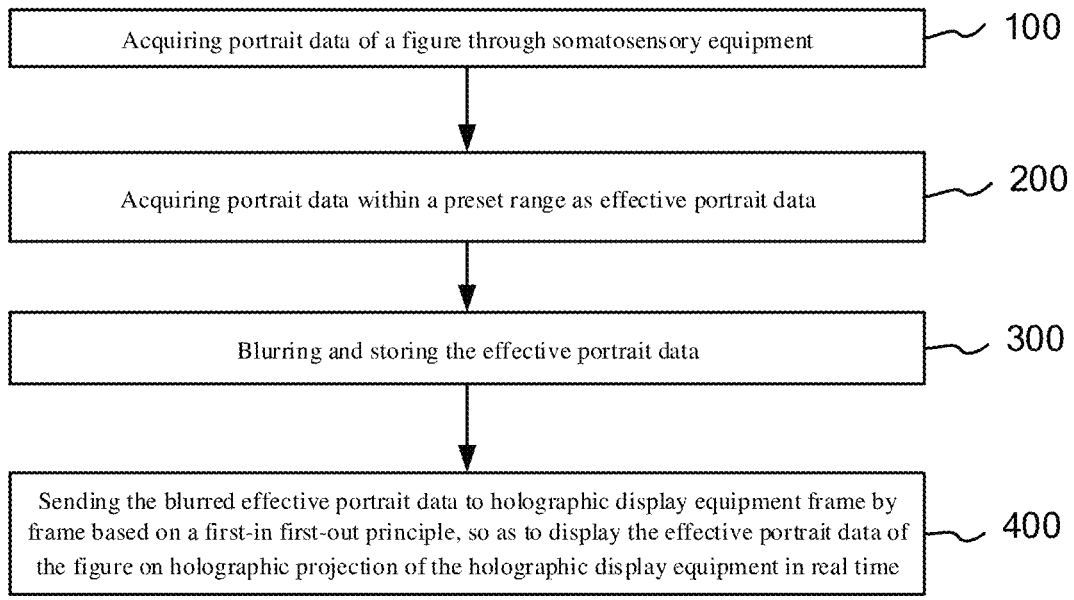
FIG. 1 is a schematic diagram of one embodiment of the method in the embodiment of present application for displaying a holographic portrait in real time.

Below will describe the specific flow in the embodiment of present application. See FIG. 1, one embodiment of the method in the embodiment of present application for displaying a holographic portrait in real time comprises:

100. Acquiring portrait data of a figure through somatosensory equipment.

In this embodiment, the present application provides a system for displaying a holographic portrait in real time, applicable to acquiring portrait data of a figure through somatosensory equipment. The somatosensory equipment can be Kinect somatosensory peripheral, and Kinect is XBOX360 somatosensory peripheral launched by Microsoft. Kinect somatosensory equipment thoroughly overturns single operation of a game, so as to reflect a human-computer interaction concept more thoroughly, enhance an operating mode of a game, and improve user experience. Of course, the somatosensory equipment can also be other somatosensory peripherals with the same functions for acquiring three-dimensional bodily sensation of a human body.

200. Acquiring portrait data within a preset range as effective portrait data.

In this embodiment, the somatosensory equipment acquires portrait data of a figure, and the present application further presets a reasonable boundary range capable of capturing a portrait according to the environment of the specific application scenario of the figure; the portrait data within the preset range is used as effective portrait data. That is, the portrait data within the preset range is helpful for subsequent recognition, and this step eliminates ineffective portrait data and further improves the transmission efficiency and accuracy. The portrait data is further calibrated and cut to obtain portrait data within the preset range as effective portrait data

300. Blurring and storing the effective portrait data.

In this embodiment, the effective portrait data is blurred, so as to make the transmission process of effective portrait data more efficient, and also provide a feathering effect for a frame to make the portrait displayed in the holographic display equipment more smooth. If the blurred portrait data is not added, certain white edges will occur on the portrait outline, i.e. interference in the transmission process of effective portrait data; after blurring is added, the interference on display of portrait outline can be reduced effectively, consequently to make the portrait frame shown on the holographic display equipment more smooth. Then the computer equipment stores the blurred effective portrait data.

400. Sending the blurred effective portrait data to holographic display equipment frame by frame based on a first-in first-out principle, so as to display the effective portrait data of the figure on holographic projection of the holographic display equipment in real time.

In this embodiment, the effective portrait data saved in the computer equipment memory is transmitted to the holographic display equipment, and the holographic display equipment outputs the effective portrait data before the screen of the holographic display equipment in a holographic manner; the output result is the portrait consisting of effective portrait data; the somatosensory equipment sends effective portrait data to holographic display equipment in real time, therefore, the portrait in the holographic display equipment is synchronized with the figure, and finally the holographic display equipment displays the holographic portrait in real time.

For the first-in first-out rule, it should be noted that, each frame of the effective portrait data stored in the computer equipment will be replaced, i.e. frame-to-frame replacement; after the last frame of effective portrait data is sent to the holographic display equipment, it will be replaced as the next frame of effective portrait data, consequently to reach real-time property.

In this embodiment, the somatosensory equipment acquires portrait data of a figure; the computer equipment acquires portrait data within a preset range as effective portrait data; the computer equipment blurs and stores the effective portrait data; the computer equipment sends the blurred effective portrait data to holographic display equipment frame by frame based on a first-in first-out principle, so as to display the effective portrait data of the figure on holographic projection of the holographic display equipment in real time, achieve real-time display of the holographic portrait, have a lower latency and improve user experience.

Furthermore, the step of acquiring portrait data within a preset range as effective portrait data comprises:

acquiring portrait data of a figure through a color camera sensor and a depth sensor of somatosensory equipment, each pixel point in the portrait data having corresponding coordinates;

taking the portrait data of the coordinates within a coordinate interval as effective portrait data according to the coordinate interval corresponding to the preset range.

In this embodiment, for example of somatosensory equipment as Kinect equipment, an acquisition end of Kinect equipment acquires portrait data in the environment through a color camera sensor and a depth sensor, i.e. acquires color information and depth information corresponding to a figure. Kinect equipment acquires effective portrait data, and each pixel point in the acquired portrait data has its corresponding coordinates: (x,y,z); a reasonable boundary coordinate parameter (i.e. preset range) which can be captured is set according to the environment of the application scenario of Kinect equipment: Xmin, Xmax, Ymin, Ymax, Zmin and Zmax; according to the value of the boundary coordinate parameter, the coordinate range of a pixel point of the effective portrait data shall be (Xmin~Xmax, Ymin~Ymax, Zmin~Zmax), i.e. the corresponding coordinates (x,y,z) of the pixel point in the portrait data must meet Xmin<x<Xmax, Ymin<y<Ymax, Zmin<z<Zmax, thus the pixel point in the portrait data can be deemed as effective portrait data. The effective portrait data have corresponding colors, and the color source is the actual color corresponding to the acquired figure in the process of acquiring a portrait by Kinect acquisition end; the Kinect acquisition end is for acquiring data in real time, i.e. each frame in the application scenario is acquired and the effective portrait data is extracted.

Furthermore, the step of blurring and storing the effective portrait data comprises:

blurring the effective portrait data by mean filter technology;

storing the blurred effective portrait data frame by frame.

In this embodiment, the present application further blurs the effective portrait data, for example of holographic display equipment as HoloLens equipment, the effective portrait point source information is blurred by mean filter technology, so as to make the transmission process of the effective portrait point source information more efficient and also provide feathering effects for the frame (make the portrait displayed in Hololens equipment more smooth). If the portrait point source information processed by mean filter technology is not added through observation of the Hololens equipment, certain white edges will occur on the portrait outline, i.e. interference in the transmission process of effective portrait point source information; after the mean filter technology is added, the interference on display of portrait outline can be reduced effectively, consequently to make the portrait frame shown on the Hololens equipment more smooth.

In practical application, the formula corresponding to the mean filter technology is: $g(x,y)=1/m\Sigma f(x,y)$, wherein $g(x,y)$ represents the gray scale of the image on this point after processing, and m represents the total number of pixels, including the current pixel. Specifically, linear smoothing filter, a typical linear filter algorithm, refers to provision of a template to a target pixel on the image, and this template includes neighboring pixels around (eight pixels centered on the target pixel, constituting a filter template, i.e., removing the target pixel itself); then the original pixel value is replaced with the mean value of all pixels in the template. The main method used by linear smoothing filter, also called mean filter, is a domain mean method. The basic principle of linear smoothing filter is to replace each pixel value in the original image with the mean value, i.e. for the current pixel point (x,y) to be processed, select a template, which consists of a plurality of pixels nearby, calculate the mean value of all pixels in the template, then assign this mean value to the current pixel point (x,y) as gray scale $g(x,y)$ of the image on this point after processing, i.e. $g(x,y)=1/m\Sigma f(x,y)$, in which, m is the total number of pixels in this template, including the current pixel, and $\Sigma f(x,y)$ is the gray level sum of all pixels in the template. "Sharp" change of the image is reduced by linear smoothing filter. Since the typical random noise consists of gray-scale rapid changes, the common smoothing application is noise reduction.

Thereafter, the blurred effective portrait data is stored frame by frame. Specifically, the portrait data comprises depth information and color information; the step of storing the effective portrait data comprises: saving depth information and color information corresponding to the effective portrait data in a preset depth information vector list and color information vector list frame by frame through inserting a function of a corresponding parameter in a data cube.

In this embodiment, the computer equipment is provided with Kinect service end, and the present application declares two lists (goodVertices and goodColorPoints) with types of vector as the carrier of storing effective portrait data, wherein Vector refers to a three-dimensional vector. Data involved in the algorithm are the information of each pixel stored with a three-dimensional vector; goodVertices and goodColorPoints represent effective depth information (vector list) and effective color information (vector list) respectively, i.e. depth information vector list and color information vector list.

Kinect acquisition end stores the effective portrait data (in form of coordinates) and corresponding colors in two previously declared lists goodVertices and goodColorPoints with types of vector through a function push_back( ) in c++ (i.e. function inserting corresponding parameters in data cube), and the effective portrait data stored in two lists are always the last frame of the effective portrait point source information (i.e. effective portrait data) acquired by the acquisition end, i.e. after Kinect equipment is opened in goodVertices list and goodColorPoints list, each frame of the effective portrait point source information will be replaced to achieve the real-time property. That is, the depth information vector list and color information vector list only save depth information and color information corresponding to one-frame effective portrait data respectively.

Furthermore, the step of sending the blurred effective portrait data to holographic display equipment frame by frame based on a first-in first-out principle, so as to display the effective portrait data of the figure on holographic projection of the holographic display equipment in real time comprises:

sending the blurred effective portrait data to computer equipment connected with somatosensory equipment data frame by frame based on a first-in first-out principle;

sending the blurred effective portrait data to holographic display equipment connected with computer equipment data and provided on the head of the figure frame by frame through the computer equipment:

displaying the blurred effective portrait data on holographic projection of the holographic display equipment in real time frame by frame through the holographic display equipment, so as to synchronize an action of a figure in holographic display equipment in real time.

In this embodiment, the somatosensory equipment is used as Kinect somatosensory peripheral; for example, the holographic display equipment is Hololens holographic computer equipment, in which the Hololens holographic computer equipment is worn on the head of the figure. Kinect acquisition end sends the last frame of effective portrait point source information stored in goodVertices and goodColorPoints to the Kinect service end of the computer equipment; Hololens equipment is connected with Kinect service end for data transmission. IP address of Hololens equipment and IP address of PC terminal (i.e. computer) are set so that PC terminal connected with Kinect service end is in the same network environment with Hololens equipment. The monitoring mode is opened at Kinect service end; when PC terminal connected with Kinect service end and Hololens are in the same network environment, the Hololens wearer opens the software in Hololens to trigger corresponding flag (a tag, used for representing the state of buffer[0]) added in Hololens, i.e. buffer[0]=0; when Kinect service end monitors the message of buffer[0]=0 sent by Hololens, the effective portrait point source information saved in the memory of Kinect service end is transmitted to Hololens at once, and Hololens outputs the effective portrait point source information before the screen of Hololens in a holographic manner; the output result is the portrait consisting of effective portrait point source information; the Kinect acquisition end sends effective data to Kinect service end in real time, therefore, the portrait in Hololens is synchronized with the figure, and finally Hololens displays the holographic portrait in real time.

Of course, after Hololens exits software or connection with Kinect is interrupted, buffer[0]≠0; when Kinect monitors the message of buffer[0]≠0, effective portrait point source information will not be sent to Hololens anymore.

To solve the problem on displaying holographic portrait in real time by Hololens, the present invention stores the effective portrait point source information acquired in the real environment in the list in form of coordinates with the help of portrait acquisition technology of Kinect equipment; when Hololens and PC terminal connected with Kinect equipment are in the same network environment, the software (the present invention) is opened to trigger corresponding message, and Kinect will send the acquired effective portrait point source information to Hololens in form of frames after monitoring this message; Hololens will display the received effective portrait point source information in a holographic manner in time, and finally Hololens displays the holographic portrait in real time.

Figure 2:
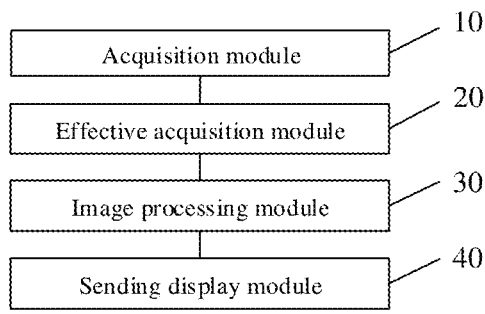
FIG. 2 is a schematic diagram of one embodiment of the device in the embodiment of present application for displaying a holographic portrait in real time.

Above describes the method in the embodiment of present application for displaying a holographic portrait in real time, and below will describe the device in the embodiment of present application for displaying a holographic portrait in real time:

Referring to FIG. 2, one embodiment of the device in the embodiment of present application for displaying a holographic portrait in real time comprises:

an acquisition module 10, used for acquiring portrait data of a figure through somatosensory equipment;

an effective acquisition module 20, used for acquiring portrait data within a preset range as effective portrait data;

an image processing module 30, used for blurring and storing the effective portrait data;

a sending display module 40, used for sending the blurred effective portrait data to holographic display equipment frame by frame based on a first-in first-out principle, so as to display the effective portrait data of the figure on holographic projection of the holographic display equipment in real time.

Figure 3:
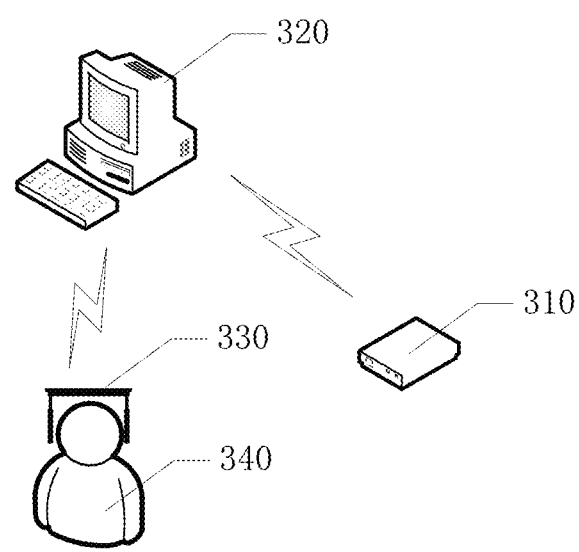
FIG. 3 is a structure diagram of the system in the embodiment of present application for displaying a holographic portrait in real time.

Above describes the terminal in the embodiment of present application from the point of templated functional entity, and below will describe the system in the embodiment of present application for displaying a holographic portrait in real time from the point of hardware processing; referring to FIG. 3, the system in the embodiment of present application for displaying a holographic portrait in real time comprises:

somatosensory equipment 310, computer equipment 320 and holographic display equipment 330; the somatosensory equipment 310 is connected with the computer equipment 320 in a wired or wireless manner; the computer equipment 320 is connected with the holographic display equipment 330 in a wired or wireless manner;

The somatosensory equipment 310 acquires portrait data of a figure 340 and sends to computer equipment 320;

The computer equipment 320 acquires portrait data within a preset range as effective portrait data;

The computer equipment 320 blurs and stores the effective portrait data;

The computer equipment 320 sends the blurred effective portrait data to holographic display equipment 330 frame by frame based on a first-in first-out principle;

The holographic display equipment 330 displays the effective portrait data of the figure 340 on holographic projection of the holographic display equipment 330 in real time.

It should be noted that, to improve the transmission efficiency, preferably, the somatosensory equipment 310 is hardware connection with the computer equipment 320, i.e. wired connection. However, to reduce space limitation to the figure, the computer equipment 320 is connected with the holographic display equipment 330 in a wireless manner. In practical application, the somatosensory equipment 310 can also acquire portrait data within the preset range as effective portrait data and blurs the effective portrait data, which is then stored in the computer equipment 320. The holographic display equipment 330 is provided on the head of the figure 340 (or user), and the user wears the holographic display equipment 330. Preferably, the somatosensory equipment is Kinect somatosensory peripheral; the holographic display equipment is Hololens holographic computer equipment; the computer equipment is PC terminal.

Below will describe the method in the present application for displaying a holographic portrait in real time by combining FIG. 3:

Step 1: erect Kinect equipment in the real space. The Kinect equipment camera shall be 1.5 m high, the included angle with the horizontal plane is 30°, and it's best to keep a distance of 1.3 m-1.5 m from the figure whose portrait point source information is to be acquired to the front of the camera.

Step 2: Prepare a PC terminal, and install SDK (KinectSDK-v2.0_1409-Setup or higher version) of Kinect on PC terminal, then LiveScanClient and LiveScanServer are installed, wherein LiveScanClient is a running software of Kinect acquisition end (Kinect acquisition end will send the acquired effective portrait point source information to Kinect service end), and LiveScanServer is a running software of Kinect service end (Kinect service end stored the data sent by Kinect acquisition end in the designated list and only the last frame is stored).

Step 3: Conduct hardware connection between PC terminal and Kinect equipment, and open StartServer in LiveScanSever, i.e. the service of Kinect service end is opened, and its function includes monitoring whether Hololens has a request of sending connection to the service end.

Step 4: Open Connect in LiveScanClient, and the function includes internal connection between Kinect acquisition end and Kinect service end; Kinect acquisition end can send the effective portrait point source information to Kinect service end; meanwhile Show line of Kinect service end is opened, and the function includes generating a new window, displaying the received effective portrait point source information in the corresponding window for observation and meanwhile calibrating the positions of the figure and Kinect equipment; in the meantime, click the button "Show line" of Kinect service end software, open the window "calibrate and cut"; in this window, a user can observe the position relation of the own 3D image with the origin in real time, consequently to adjust the installation position of Kinect or the standing position of the figure, and achieve the best image acquisition point location. In the meantime, this window "calibrate and cut" can cut a frame, and cut the ineffective region through adjusting the maximum and minimum in X, Y, Z axis, in order to preserve an effective imaging space (i.e. preset range). The best 3D image acquisition effect is achieved through these two steps. That is, the portrait data are calibrated and cut to obtain effective portrait data.

Step 5: Open Hololens, configure IP address for PC terminal connected with the Kinect equipment, or connect the PC terminal and Hololens under the same router, in order to keep them in the same network environment.

Step 6: Wear Hololens by the figure whose portrait point source information is to be acquired, and then open the software (the present invention) in Hololens; through the compilation function of software, Hololens can extract the real-time effective portrait point source information on Kinect equipment, and thereafter the portrait point source information is displayed on the holographic projection of Hololens; the real-time actions of the figure will be synchronized in Hololens.

In conclusion, the present invention can realize real-time display of Hololens holographic portrait captured on basis of Kinect image, so as to provide lower latency and improve user experience.

Those skilled in the art can clearly understand that for convenient and simple description, the specific working processes of the systems, the device and the units described above can refer to the corresponding processes in the foregoing method embodiments, and are not repeated here.

In several embodiments provided by the present application, it should be understood that, the disclosed system, device and method can be realized by other ways. For example, the above device embodiments are only schematic, e.g., the division of the unit is only one logic function division, and in fact the unit can be divided in another way, for example, multiple units or modules can be combined or integrated to another system, or some features can be omitted, or not executed. Another point is that, mutual coupling or direct coupling or communication connection displayed or discussed can be indirect coupling or communication connection of devices or units electrically, mechanically or by other forms through some interfaces.

The unit described as a separator can be or cannot be separated physically, the component displayed as a unit can be or cannot be a physical unit, i.e., can be located in one position, or can also be distributed on multiple network units. Some or all units therein can be selected to achieve the purpose of the present embodiment according to actual needs.

Moreover, all function units in each embodiment of the present application can be integrated in one processing unit, or all units can also physically exist independently, or two or over units are integrated in one unit. The unit can be integrated in the form of hardware, and can also be integrated in the form of software function unit.

If the unit is integrated in the form of software function unit and used as an independent product for sale or use, it can be stored in a computer-readable storage medium. Based on such understandings, the technical solutions or part or all of the technical solutions disclosed in the present invention that makes contributions to the prior art may be essentially embodied in the form of a software product which can be stored in a storage medium, comprising numerous commands for facilitating one computer equipment (e.g., a personal computer, a server or a network equipment) to execute part or all steps of the method described by the embodiments of the present application. However, the foregoing storage medium includes: various mediums which can be used for storing program codes, such as U disk, mobile hard disk, Read-Only Memory (ROM), Random Access Memory (RAM), diskette or optical disk.

The above embodiments are merely provided for describing the technical solutions of the present invention, not limitation. Although the present application with reference to the aforesaid embodiments has been described in detail, a person skilled in the art should understand: They can also modify technical solutions recorded in the aforesaid embodiments, or equivalently replace some technical features therein; but these modifications or replacements will not make the nature of the corresponding technical solution depart from the spirit and scope of the technical solution in each embodiment of the present application.

What is claimed is:

1. A method for displaying a holographic portrait in real time, comprising:
    collecting portrait data of a figure through somatosensory equipment;
    acquiring portrait data within a preset range as effective portrait data;
    blurring and storing the effective portrait data; and
    sending the blurred effective portrait data to holographic display equipment frame by frame based on a first-in first-out principle, so as to display the effective portrait data of the figure on holographic projection of the holographic display equipment in real time.

2. The method according to claim 1, wherein the step of acquiring portrait data within a preset range as effective portrait data comprises:

acquiring portrait data of a figure through a color camera sensor and a depth sensor of somatosensory equipment, each pixel point in the portrait data having corresponding coordinates.

3. The method according to claim 1, wherein the step of blurring and storing the effective portrait data comprises:
blurring the effective portrait data by mean filter technology.

4. The method according to claim 1, wherein the portrait data comprises depth information and color information; the step of storing the effective portrait data comprises:
saving depth information and color information corresponding to the effective portrait data in a preset depth information vector list and color information vector list.

5. The method according to claim 1, wherein the depth information vector list and color information vector list only save depth information and color information corresponding to one-frame effective portrait data respectively.

6. The method according to claim 1, wherein the step of sending the blurred effective portrait data to holographic display equipment frame by frame based on a first-in first-out principle, so as to display the effective portrait data of the figure on holographic projection of the holographic display equipment in real time comprises:
sending the blurred effective portrait data to computer equipment connected with somatosensory equipment data frame by frame based on a first-in first-out principle.

7. The method according to claim 1, wherein the somatosensory equipment is Kinect somatosensory peripheral.

8. A device for displaying a holographic portrait in real time, comprising:
a collection module, used for collecting portrait data of a figure through somatosensory equipment;
an effective acquisition module, used for acquiring portrait data within a preset range as effective portrait data;
an image processing module, used for blurring and storing the effective portrait data;
a sending display module, used for sending the blurred effective portrait data to holographic display equipment frame by frame based on a first-in first-out principle, so as to display the effective portrait data of the figure on holographic projection of the holographic display equipment in real time.

9. A system for displaying a holographic portrait in real time, comprising somatosensory equipment;
computer equipment; and
holographic display equipment, wherein the somatosensory equipment is connected with computer equipment in a wired or wireless manner; the computer equipment is connected with the holographic display equipment in a wired or wireless manner; the somatosensory equipment collects portrait data of a figure and sends to computer equipment; the computer equipment acquires portrait data within a preset range as effective portrait data; the computer equipment blurs and stores the effective portrait data; the computer equipment sends the blurred effective portrait data to holographic display equipment frame by frame based on a first-in first-out principle, the holographic display equipment displays the effective portrait data of the figure on holographic projection of the holographic display equipment in real time.

10. The method according to claim 2, wherein the step of acquiring portrait data within a preset range as effective portrait data comprises:
taking the portrait data of the coordinates within a coordinate interval as effective portrait data according to the coordinate interval corresponding to the preset range.

11. The method according to claim 3, wherein the step of blurring and storing the effective portrait data further comprises:
storing the blurred effective portrait data frame by frame.

12. The method according to claim 4, wherein the step of saving depth information and color information includes inserting a function of a corresponding parameter in a data cube frame by frame.

13. The method according to claim 6, wherein the step of sending the blurred effective portrait data to holographic display equipment frame by frame based on a first-in first-out principle, so as to display the effective portrait data of the figure on holographic projection of the holographic display equipment in real time further comprises:
sending the blurred effective portrait data to holographic display equipment connected with computer equipment data and provided on the head of the figure frame by frame through the computer equipment.

14. The method according to claim 13, wherein the step of sending the blurred effective portrait data to holographic display equipment frame by frame based on a first-in first-out principle, so as to display the effective portrait data of the figure on holographic projection of the holographic display equipment in real time further comprises:
displaying the blurred effective portrait data on holographic projection of the holographic display equipment in real time frame by frame through the holographic display equipment, so as to synchronize an action of a figure in holographic display equipment in real time.

15. The method according to claim 1, wherein the holographic display equipment is Hololens holographic computer equipment.

16. The device of claim 8, wherein the effective acquisition module is configured to acquire portrait data of a figure through a color camera sensor and a depth sensor of somatosensory equipment, each pixel point in the portrait data having corresponding coordinates.

17. The device of claim 8, wherein the effective acquisition module is configured to take the portrait data of the coordinates within a coordinate interval as effective portrait data according to the coordinate interval corresponding to the preset range.

18. The device of claim 8, wherein the image processing module is configured to blur the effective portrait data by mean filter technology.

19. The device of claim 8, wherein the image processing module is configured to store the blurred effective portrait data frame by frame.

20. The device of claim 8, wherein the sending display module is configured to send the blurred effective portrait data to computer equipment connected with somatosensory equipment data frame by frame based on a first-in first-out principle.

* * * * *